F. W. WOOD.
ELECTRIC INDICATOR.
APPLICATION FILED AUG. 7, 1919.
1,396,803.
Patented Nov. 15, 1921.
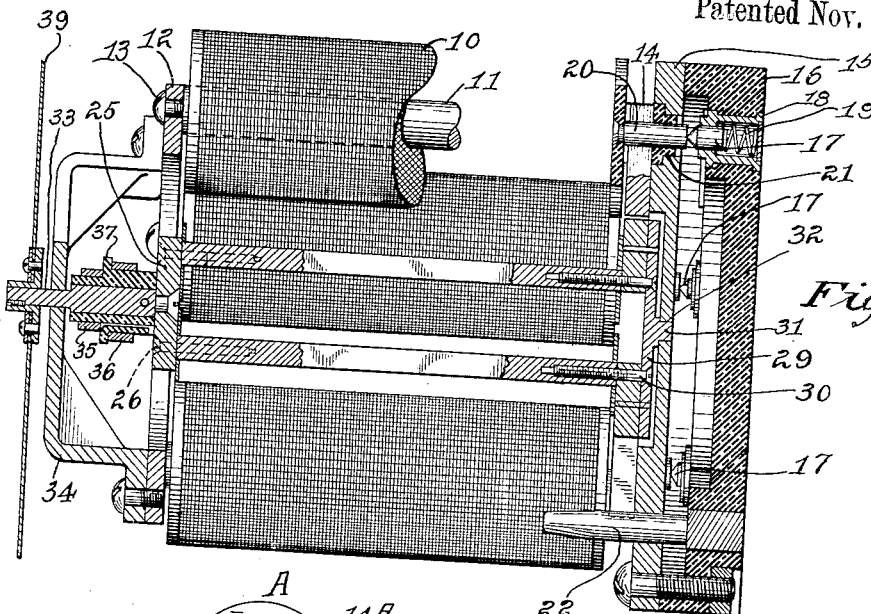
Fig. 1.
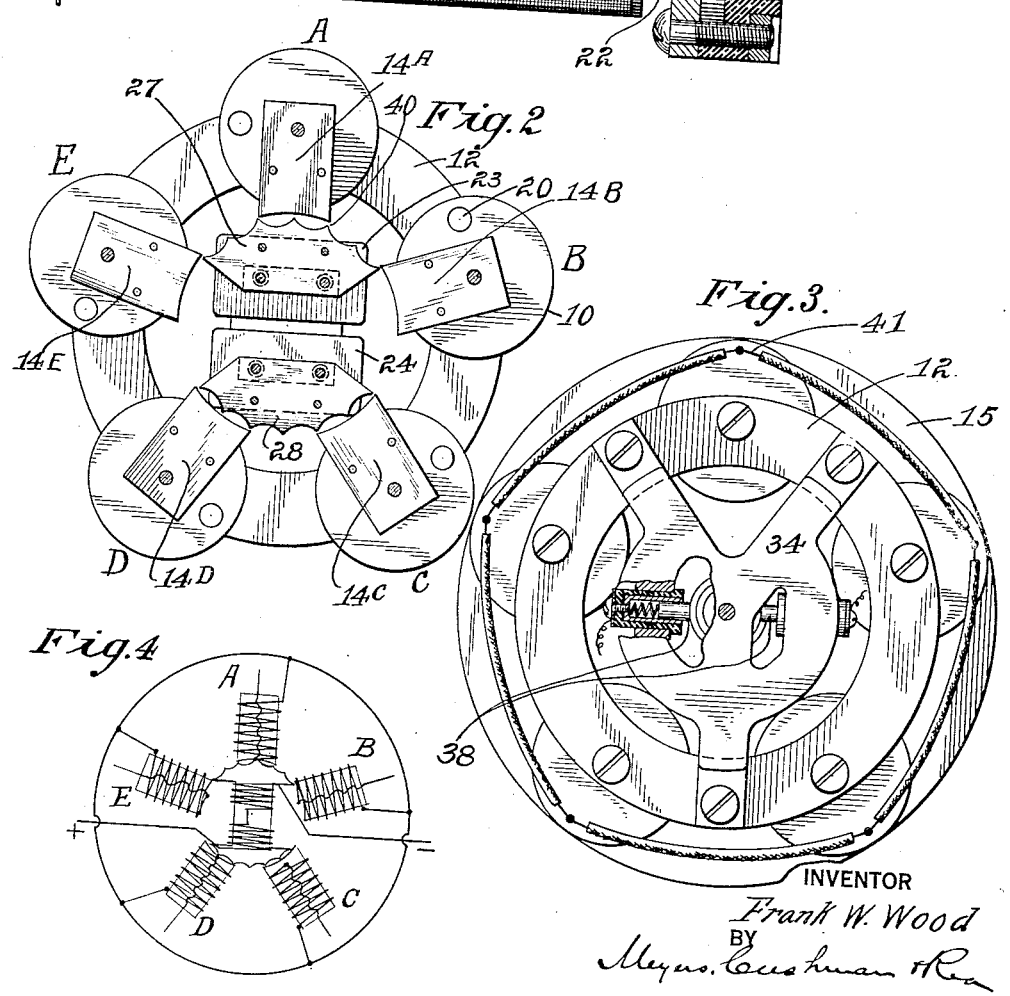
Fig. 2.
Fig. 3.
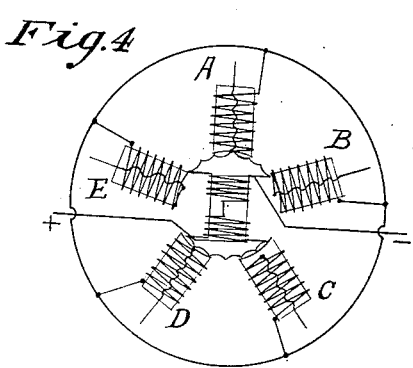
Fig. 4.
INVENTOR
Frank W. Wood
BY
ATTORNEY

UNITED STATES PATENT OFFICE.

FRANK W. WOOD, OF MONTCLAIR, NEW JERSEY, ASSIGNOR TO CHARLES CORY & SON, INCORPORATED, OF NEW YORK, N. Y., A CORPORATION OF NEW YORK.

ELECTRIC INDICATOR.

1,396,803.

Specification of Letters Patent. Patented Nov. 15, 1921.

Application filed August 7, 1919. Serial No. 316,003.

*To all whom it may concern:*

Be it known that I, FRANK W. WOOD, a citizen of the United States, residing at Montclair, in the county of Essex and State of New Jersey, have invented new and useful Improvements in Electric Indicators, of which the following is a specification.

My invention relates to electric indicator systems for transmitting signals and particularly to a receiver for such a system carrying indicating means positioned by the energizing of magnetic elements in the receiver.

Systems of this kind generally consist of a transmitter and a receiver, the transmitter including a rotating indicator, and the receiver having a similar indicator which follows the motion of the transmitting indicator and shows the position thereof. Systems of this kind are particularly adapted for transmitting signals, orders, or other information either by means of dial and pointer or similar rotating indicating means, the position of the dial or pointer of the transmitter being reproduced on the dial or pointer of the receiver. Such systems are particularly used on ship board for the purpose, for instance, of indicating the course of the vessel, the number of revolutions per minute of the engine shaft, the angular position of a torpedo gyroscope, the angle of the rudder, or to transmit orders from central control stations.

My invention relates particularly to a receiver for a system of this kind, my receiver being of the motor type having a stator composed of a plurality of field magnets each having a pole piece, a rotor inside the stator preferably having a plurality of magnets, each having a pole piece which coöperates with those of the stator to form magnetic circuits, the magnets being so arranged that the energizing of selected field magnets will definitely position the rotor through balancing of magnetic forces, and will correspondingly fix the position of an indicating element such as a dial or pointer carried by the rotor shaft. The transmitter may be of the type shown in Patent No. 1,100,860 granted to me on June 23, 1914, in which a rotating contact arm coöperates with suitable contacts thereabout to energize selected field magnets, the magnets which are energized being determined by the position of the contact arm which carries an indicating element similar to that on the transmitter. It will be seen that by a proper arrangement such as that indicated in the above patent, the position of the transmitter indicator will be exactly duplicated by the receiver indicator.

An object of my invention is to arrange and construct the receiver so that a larger number of positions for the indicators may be obtained with the same number of field magnets. In the construction of the patent, for instance, five field magnets are used to produce ten indicator positions, while in my construction, the same number of field magnets will locate the indicator in 20 different positions. The transmitter is not shown or described herein, as it forms no part of my invention and may be of any desired form or type.

I have so constructed my receiver that I may locate all the pole pieces at one end of the magnet structure, where they are readily accessible, instead of having them substantially in the middle thereof. Furthermore, I have utilized a single set of pole pieces on the field magnets and have eliminated the use of coaxial pairs of magnets, thus reducing the cost of the construction and increasing the simplicity and efficiency of the indicator. I have mounted my entire structure upon, so as to be readily detachable from, its base, which also carries the electric connections, facilitating the repair and adjustment of the unit without disturbing its mounting or disconnecting circuits from the mounting. I have also provided rotor pole pieces of improved construction having a series of salient poles which facilitate the accurate and quick location of the rotor in exact position, the pole pieces having faces long enough to lie opposite adjacent field magnets poles, rendering the rotor readily responsive to changes in the magnetic field.

Further objects and advantages of my invention will be apparent from the following description taken in connection with the accompanying drawings, in which:

Figure 1 is a longitudinal cross-sectional view of the indicator,

Fig. 2 is a bottom plan view with the base structure broken away,

Fig. 3 is a top plan view, part being broken away, and

Fig. 4 is a wiring diagram.

The indicator includes a plurality of field magnets concentrically arranged to form a motor stator. I have shown them as being five in number lettered from A to E inclusive; but it will be apparent that my invention is equally applicable to any selected number of field magnets. Each of these magnets consists of the usual windings 10 about a core 11 which is mounted on an annular plate 12 as by screw 13. At the opposite end of the magnet from plate 12 and preferably adjacent the base of the indicator, is mounted pole piece 14. The magnets are mounted on carrier plate 15 by means of screws passing therefrom into the cores of the magnets. Carrier plate 15, which carries the entire indicator mechanism, is adapted to be removably mounted upon base 16 by means of screws, said base carrying a plurality of contact studs 17, each mounted in a cylindrical holder 18 in the base, a spring 19 in each holder serving to press the stud outwardly. A contact rod 20 is mounted in the rear end of each field magnet, and connected to one end of the winding thereof, passing through a suitable insulating block 21 in carier plate 15 and being located so as to press against contact stud 17 when plate 15 is in position with base 16. A positioning stud 22 may be mounted in the base registered with a suitable aperture in carrier plate 15, facilitating the positioning of the carrier plate accurately on the base when mounting the indicator. It will be apparent that this construction makes it possible to permanently fix the base in the desired location and to connect the holders 18 with the proper circuits, the magnets being connected to the circuits and the indicator mounted in position by merely fixing carrier plate 15 upon the base, the carrier plate and its mechanism being readily detachable for repairs without deranging the base or its connections.

The rotor consists of two magnets, each having a pole piece coöperating with the stator pole pieces. The rotor magnets may be constructed and arranged in various ways. I have shown them as composed of two separate windings 23 and 24 mounted side by side upon a plate 25 to which they are attached as by screws 26. At the opposite end, the rotor magnets carry pole pieces 27 and 28 and are mounted upon plate 29 overlying the pole pieces, the parts being fixed in position in any desired manner as by screws 30 passing through the plate 29 and the pole pieces into the cores of the rotor magnets 23 and 24. Plate 29 has an annular centrally projecting stud 31 which revolves in an aperture 32 in carrier plate 15, forming a bearing for one end of the rotor. Plate 25 at the opposite end of the rotor has mounted thereon a short shaft 33 revolving in a bearing in spider 34 which is mounted on annular plate 12. Between spider 34 and plate 25, collector rings 35 and 36 are mounted on a block of insulation 37 on shaft 33. Each collector ring is in contact with an insulated spring pressed brush 38 carried by spider 34. The outer end of shaft 33 is extended through the spider and carries suitable indicating means, such, for instance, as dial 39.

Pole pieces 27 and 28 are formed along their outer faces into a series of salient poles 40 concentrically arranged about the axis of rotation of the rotor. The distance between salient poles is an integral part of the length of the adjacent face of field magnet pole piece 14. Preferably the distance between adjacent salient poles 40 is equal to half the width of the face of pole piece 14. The distance between the faces of adjacent field magnet pole pieces is, in this case, equal to the width of each face. With this construction, it will be seen that when the rotor revolves through an angle equal to one quarter of the angular distance between centers of adjacent field magnets, the salient poles of the rotor pole pieces will lie either exactly in the middle or at the extreme ends of the field magnet pole pieces and it will be apparent that this construction facilitates the positive accurate location of the pole pieces in fixed position when the circuits are suitably energized. While I have shown the rotor pole pieces as having seven poles, it is obvious that this number may be varied so long as the fundamental relation between the spacing of the salient poles, the width of the field magnet pole pieces and the distance between adjacent field magnet pole pieces is maintained.

I have shown in Fig. 4 one method of arranging the electrical circuits in my receiver. By this method, each field magnet is wound in the same direction so that a current passing through the magnets from top to bottom would produce the same polarity in each. I prefer to connect the corresponding end of each winding to a common connector such as wire 41, as shown in Fig. 3. The opposite end of each field magnet winding is connected to the transmitter which coöperates to energize proper field magnets so as to position the rotor in respect thereto. The rotor magnets 23 and 24 are wound in opposite directions so that pole pieces 27 and 28 are of opposite polarity, the magnets being connected in series and having the opposite ends of their respective windings connected to collector rings 35 and 36 which are connected through brushes 38 with the opposite poles of the source of electrical energy. Obviously, the method of arranging and energizing the rotor magnets may be varied considerably; but in any event, it is desirable that they maintain permanent opposite polarity.

My indicator is operated in substantially the same manner as is disclosed in my application No. 262,313, filed November, 1918 and may be operated by any suitable form of transmitter such as the one shown in said application, or any suitable adaptation of the transmitter shown and described in my above mentioned patent. By suitably energizing selected field magnets, the rotor may have twenty different positions if five field magnets are used, each pole piece being positively located either directly opposite a field magnet pole piece or in any one of three equally spaced positions between adjacent field magnet pole pieces. By properly operating a suitable transmitter, the receiver indicator may be moved by a step by step motion, consisting of twenty steps in completing a full revolution; but it is to be understood that each position of the indicator is entirely independent of its previous position, and that my construction is, in this respect, entirely different from indicators ordinarily referred to as "step by step," in which the position of the indicator is dependent upon its previous condition and the mechanism is adapted merely to move it one step at a time.

The rotation of the indicator may be divided into five parts or cycles, each of which is exactly the same and consists in a four-step motion from a position with one rotor pole piece centered opposite a field magnet pole piece to a position with the same rotor pole piece centered opposite the next adjacent field magnet pole piece. Assuming that rotor pole piece 24 in Fig. 2 is positive and pole piece 23 negative, the position shown in said figure will be produced by connecting field magnet A with the negative terminal of a source of electrical energy and field magnets C and D with the positive terminal of said source. This will produce two opposite magnetic circuits, one between pole pieces 14$^a$ and pole piece 27, the other between pole pieces 14$^c$ and 14$^d$ and the pole piece 28. To balance the magnetic field, it will be apparent that pole piece 27 must be located exactly opposite pole piece 14$^a$ and the pole piece 28 must be exactly midway between the magnetic pole pieces 14$^c$ and 14$^d$. The arrangement of salient poles 40 is such that a positive location of the rotor pole pieces is assured because in the normal position it will be seen that salient poles are located adjacent opposite sides of each of the energized field magnet pole pieces, so that a slight rotation of the rotor in either direction would tend to pull three salient poles away from adjacent field magnet pole pieces, an action which, of course, would be strongly resisted.

To locate the rotor in its next position, magnets A, C and D remain energized; and magnet B is connected to the same negative terminal as magnet A. This will unbalance the magnetic field about pole piece 27 and the rotor, in seeking to regain a balanced position, will move in a clockwise direction. This will, of course, tend to unbalance the field about pole piece 28, and the rotation will continue until the clockwise pull on pole piece 27 exactly balances the counter-clockwise pull on pole piece 28. This position will be attained when the rotor has moved through one quarter of the distance between adjacent field magnets. In this position, the rotor pole pieces will have magnets B and C respectively pulling in opposite directions on two salient poles each, while magnets A and D are pulling in opposite directions on three poles each, leaving one salient pole of each pole-piece projecting beyond magnets A and D. In this position, the forces exerted by the magnetic fields at opposite sides of the rotor exactly balance each other and the rotor will be positively positioned. It will, moreover, be apparent that in this position any tendency to rotate the rotor will also tend to move three salient poles away from each of two field magnet pole pieces and will consequently be strongly resisted.

The next step in the cycle is produced by disconnecting field magnet C, leaving magnets A, B and D in contact. This produces a condition exactly similar to the first position, except that the single magnet (D) is located on the opposite side of the rotor. In this second position, the rotor pole piece 28 will be centered opposite field magnet pole piece 14$^d$ and rotor pole piece 27 will be balanced between field magnet pole pieces 14$^a$ and 14$^b$, the rotor being in a state of equilibrium as regards the magnetic forces exerted thereon. To shift the rotor to the next operative position in the cycle, field magnet E is connected to the same positive terminal as magnet D. This produces an unbalanced condition similar to that above described in connection with the shift from the normal to the first position, and the rotor will be moved through another step, coming to rest with the two left hand salient poles of pole piece 27 adjacent pole piece 14$^a$, and the second, third and fourth poles adjacent pole piece 14$^b$, while the opposite rotor pole piece is correspondingly located with three salient poles opposite pole piece 14$^d$ and two opposite pole pieces 14$^e$, in which position the opposite magnetic fields, each produced by two adjacent field magnets, balance each other in their pull on the rotor. To complete the cycle, and to turn the rotor to what may be called its second normal position, field magnet A is deënergized, and pole piece 27 takes its position centered opposite pole piece 14$^b$ with pole piece 28 symmetrically located opposite pole pieces 14$^d$ and 14$^e$. This position is exactly the same as the initial position, except that field magnet B replaces field magnet A. The number of cycles is dependent only upon the number of field magnets used, it being apparent that if an even number of magnets is utilized, the same effect can be obtained by proper arrangement of the rotor pole pieces so that when one rotor pole piece is exactly opposite a field magnet pole piece, the opposite rotor pole piece will be symmetrically positioned between two other field magnet pole pieces. This arrangement is not so desirable, however, as the rotor is not symmetrical since the pole pieces are not diametrically opposite to each other.

Several other variations in my construction may be made without departing from my invention both in the construction and operation of the receiver. It will be obvious, for instance, that more than two rotor magnets and pole pieces may be used, and that the rotor pole pieces may be constructed of sufficient width so that more than two adjacent magnets may be energized to operate on a single pole piece. It is, of course, possible by this latter system to provide more than four positions in each cycle in which the rotor may be definitely located, as the number of methods of unbalancing the magnetic field at opposite sides of the rotor is multiplied. It will also be evident that the number of salient poles may be varied; but in this connection, attention is called to the fact that I have provided five equally spaced salient poles. This is of particular advantage as it enables me to so arrange the pole pieces that, at all times, any movement of the rotor without a change in the magnetic field will tend to pull three salient poles away from the field pole pieces. While I have described the salient poles as being located in the rotor magnet pole pieces, it will be apparent that they may be formed on the field magnet pole pieces; but I consider the construction disclosed to be preferable.

In the continuous step by step rotation of the rotor, it will be noted that each of the field magnets is positively energized during seven of said steps, remains inactive for a succeeding three steps, and then is negatively energized for the subsequent seven steps. In order to have a salient pole adjacent the edge of a field magnet pole piece face during each of the seven steps during which the magnet is energized, I have provided seven salient poles; but it will be apparent that while this is desirable it is not a necessary arrangement and that a larger number of poles may be used, particularly if the number of field magnets is multiplied and the number of steps increased. It will be apparent, however, that in any event the equal spacing of the field magnet pole pieces and the length of their respective faces makes it desirable to have an odd number of salient poles, as any other arrangement would prevent the exact location of the poles adjacent the outer edges of the field magnet pole piece faces.

It will be noted that, aside from the electrical advantages of my construction, I have provided a particularly desirable mechanical arrangement. The entire unit is mounted on a base, and is free from the casing (not shown) which usually surrounds indicators of this type, permitting the removal of the entire unit without disturbing the base or electrical connections. The rotor is readily removed by simply detaching the spider 34 from plate 12. Furthermore, the use of large single magnets instead of coaxial pairs permits the ready replacement of a defective magnet without the disturbance of the rest of the structure and without substantially deranging the indicator.

While I have described a specific form of my invention, and have indicated certain modifications thereof, it will be apparent that many changes may be made therein; and I do not consider my invention to be limited to the forms described further than the spirit of my invention and the scope of the claims make necessary.

I claim:

1. In an apparatus for locating a rotating element in a plurality of positions by selective operation of magnetic means, a plurality of circumferentially mounted field magnets, a radially arranged pole piece mounted on each field magnet at one end thereof, all of said pole pieces being located in the same plane, each of the said pole pieces having a pole face of predetermined length, a rotating element, a plurality of magnetic pole pieces mounted on the rotating element also at one end thereof and lying in said plane, the magnet pole pieces being each provided with a plurality of salient poles, the distance between adjacent salient poles being an integral component of the said predetermined length.

2. In an apparatus for locating a rotating element in a plurality of positions by selective operation of magnetic means, a plurality of circumferentially mounted field magnets, a radially arranged pole piece mounted on each field magnet, all of said pole pieces being located in the same plane, each of said pole pieces having a pole face of predetermined length, a rotating element, a plurality of magnetic pole pieces mounted on the rotating element and lying in said plane, the circumferential length of a magnetic pole piece being a simple multiple of the said predetermined length, the magnetic pole pieces being each provided with a plurality of salient poles, the distance between adjacent salient poles being an integral component of the said predetermined length.

3. In an apparatus for locating a rotating element in a plurality of positions by selective operation of magnetic means, a plurality of circumferentially mounted field magnets, a pole piece mounted on each field magnet and having an inwardly directed face, the length of each face being the same and being equal to the distance between adjacent pole pieces, a rotating element, a magnet pole piece mounted on said element so as to lie adjacent said faces of the field pole pieces during the rotation of said element and a plurality of equally spaced salient poles formed on the operative face of each of said rotating pole pieces, the distance between center lines of adjacent salient poles being equal to one-half the length of the coöperating face of a field magnet pole piece.

4. In an apparatus for locating a rotating element in a plurality of positions by selective operation of magnetic means, a plurality of field magnets circumferentially mounted, a radially arranged pole piece on one end of each field magnet, said pole pieces being located in the same plane and each having an inwardly directed arcuate face, said faces being of equal length; and a rotating element mounted centrally between said field magnets and including a plurality of magnets, a pole piece for each magnet mounted adjacent an end of the element and having an outwardly directed face adapted to coöperate with the field magnet pole piece faces, said rotating magnet pole piece faces having mounted thereon a plurality of salient poles spaced apart by a distance equal to one half the width of the adjacent face of a field magnet pole piece.

5. In an apparatus for locating a rotating element in a plurality of positions by selective operation of magnetic means, a plurality of circumferentially mounted field magnets, pole pieces mounted on adjacent ends of said magnets, each pole piece having an inwardly directed face, said faces being of equal length and adjacent faces being spaced by a distance equal to said face length, a rotor axially arranged with respect to the field magnets, a plurality of magnet pole pieces mounted on the rotor, each of said rotor pole pieces having an odd number of equally spaced salient poles, the construction being such that the energizing of selected field magnets will accurately locate the rotor magnet pole pieces adjacent certain field magnet pole pieces with said salient poles adjacent the outer edges of the faces of the respective field magnet pole pieces.

6. In an apparatus for locating a rotating element in a plurality of positions by selective operation of magnetic means, a plurality of circumferentially mounted field magnets, pole pieces mounted on adjacent ends of said magnets, each pole piece having an inwardly directed face, said faces being of equal length and adjacent faces being spaced by a distance equal to said face length, a rotor axially arranged with respect to the field magnets, a plurality of magnet pole pieces mounted on the rotor, each of said rotor pole pieces having an odd number, greater than three, of equally spaced salient poles, the construction being such that the energizing of selected field magnets will accurately locate the rotor magnet field pieces adjacent certain field magnet poles pieces with said salient poles adjacent the outer edges of the faces of the respective field magnet pole pieces.

7. In an apparatus for locating a rotating element in a plurality of positions by selective operation of magnetic means, a mounting plate, a single series of field magnets with its pole pieces circumferentially mounted on said plate, a rotor axially arranged with respect to the field magnets and having one end journaled in the mounting plate, a plurality of magnets mounted on and revolving with the rotor, pole pieces mounted on ends of the rotor magnets adjacent the mounting plate and adapted to coöperate with the field magnet pole pieces, means carried by one or more of said pole pieces for positioning the rotor in a predetermined position when the field magnets are selectively energized, a frame mounted on the ends of the field magnets opposite to the mounting plate, and a bearing in said frame in which the rotor is journaled.

8. In an apparatus for locating a rotating element in a plurality of positions by selective operation of magnetic means, a mounting plate, a single series of field magnets with its pole pieces circumferentially mounted on said plate, a rotor axially arranged with respect to the field magnets and having one end journaled in the mounting plate, a plurality of magnets mounted on and revolving with the rotor, pole pieces mounted on ends of the rotor magnets adjacent the mounting plate and adapted to coöperate with the field magnet pole pieces, means carried by one or more of said pole pieces for positioning the rotor in a predetermined position when the field magnets are selectively energized, a frame mounted on the ends of the field magnets opposite to the mounting plate, and a shaft carried by the rotor and journaled in said frame.

9. In an apparatus for locating a rotating element in a plurality of positions by selective operation of magnetic means, a plurality of circumferentially mounted field magnets, a pole piece mounted on each field magnet and having an inwardly directed face, the length of each face being the same and being equal to the distance between adjacent pole pieces, a rotating element, a magnet pole piece mounted on said element so as to lie adjacent said faces of the field pole pieces during the rotation of the said element, the circumferential length of a magnet pole piece face being equal to three times the length of each field pole piece face, each magnet pole piece being provided with a plurality of equally spaced salient poles formed on the operative face of each of said rotating pole pieces, the distance between adjacent salient poles being an integral component of the length of a field pole piece face.

In testimony whereof I have hereunto set my hand.

FRANK W. WOOD.